United States Patent
Bogovich et al.

(10) Patent No.: US 9,020,751 B1
(45) Date of Patent: Apr. 28, 2015

(54) ROUTE RISK MITIGATION

(71) Applicant: Allstate Insurance Company, Northbrook, IL (US)

(72) Inventors: Jason Brian Bogovich, Kent, OH (US); Julie A. Jordan, Wheeling, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/100,754

(22) Filed: Dec. 9, 2013

Related U.S. Application Data

(62) Division of application No. 12/118,021, filed on May 9, 2008, now Pat. No. 8,606,512.

(60) Provisional application No. 60/917,169, filed on May 10, 2007.

(51) Int. Cl.
 *G01C 21/00* (2006.01)
 *G08G 1/123* (2006.01)
 (Continued)

(52) U.S. Cl.
 CPC ............ *G06Q 40/08* (2013.01); *G01C 21/3415* (2013.01); *G08G 1/205* (2013.01)

(58) Field of Classification Search
 CPC ........... G01C 21/3461; G01C 21/3415; G06Q 40/08; G08G 1/096816; G08G 1/096827; G08G 1/096838; G08G 1/205
 USPC ............... 701/1, 36, 117, 400, 408, 409, 410, 701/414, 423, 424, 521, 300, 301, 302; 340/995.28, 425.5, 435, 436, 903, 3.41
 See application file for complete search history.

(56) References Cited

U.S. PATENT DOCUMENTS

| | | |
|---|---|---|
| 4,926,336 A | 5/1990 | Yamada |
| 5,270,708 A | 12/1993 | Kamishima |

(Continued)

FOREIGN PATENT DOCUMENTS

WO  2005108928  11/2005

OTHER PUBLICATIONS

Quad City Intersection Traffic Accident Study, Davenport-Rock Island-Moline Urbanized Area 1993 data, Bi-State Regional Commission, Mar. 1996; http://ntl.bts.gov/lib/000/300/338/00338.pdf; 78 pages; downloaded Apr. 8, 2008.

(Continued)

*Primary Examiner* — Rami Khatib
(74) *Attorney, Agent, or Firm* — Banner & Witcoff, Ltd.

(57) ABSTRACT

A method is disclosed for mitigating the risks associated with driving by assigning risk values to road segments and using those risk values to select less risky travel routes. Various approaches to helping users mitigate risk are presented. A computing device is configured to generate a database of risk values. That device may receive accident information, geographic information, vehicle information, and other information from one or more data sources and calculate a risk value for the associated road segment. Subsequently, the computing device may provide the associated risk value to other devices. Furthermore, a personal navigation device may receive travel route information and use that information to retrieve risk values for the road segments in the travel route. An insurance company may use this information to determine whether to adjust a quote or premium of an insurance policy. This and other aspects relating to using geographically encoded information to promote and reward risk mitigation are disclosed.

17 Claims, 5 Drawing Sheets

(51) Int. Cl.
*G01C 21/34* (2006.01)
*G06Q 40/08* (2012.01)
*G08G 1/00* (2006.01)

(56) References Cited

U.S. PATENT DOCUMENTS

| | | | | |
|---|---|---|---|---|
| 5,797,134 | A * | 8/1998 | McMillan et al. | 705/400 |
| 5,848,373 | A | 12/1998 | DeLorme et al. | |
| 6,026,345 | A | 2/2000 | Shah et al. | |
| 6,064,970 | A | 5/2000 | McMillan et al. | |
| 6,186,793 | B1 | 2/2001 | Brubaker | |
| 6,415,226 | B1 * | 7/2002 | Kozak | 701/411 |
| 6,502,020 | B2 | 12/2002 | Lang | |
| 6,868,386 | B1 | 3/2005 | Henderson et al. | |
| 6,931,309 | B2 * | 8/2005 | Phelan et al. | 701/1 |
| 7,353,111 | B2 | 4/2008 | Takahashi et al. | |
| 7,546,206 | B1 * | 6/2009 | Miller et al. | 701/415 |
| 7,657,370 | B2 * | 2/2010 | Nagase et al. | 701/465 |
| 2001/0020902 | A1 * | 9/2001 | Tamura | 340/905 |
| 2001/0039509 | A1 | 11/2001 | Dar et al. | |
| 2002/0022920 | A1 | 2/2002 | Straub | |
| 2002/0024464 | A1 | 2/2002 | Kovell et al. | |
| 2002/0095249 | A1 | 7/2002 | Lang | |
| 2002/0111725 | A1 | 8/2002 | Burge | |
| 2002/0120396 | A1 * | 8/2002 | Boies et al. | 701/209 |
| 2002/0178033 | A1 | 11/2002 | Yoshioka et al. | |
| 2004/0098464 | A1 | 5/2004 | Koch et al. | |
| 2004/0153362 | A1 | 8/2004 | Bauer et al. | |
| 2004/0254698 | A1 | 12/2004 | Hubbard et al. | |
| 2004/0260579 | A1 * | 12/2004 | Tremiti | 705/4 |
| 2005/0091175 | A9 | 4/2005 | Farmer | |
| 2005/0107951 | A1 * | 5/2005 | Brulle-Drews et al. | 701/209 |
| 2005/0174217 | A1 | 8/2005 | Basir et al. | |
| 2005/0228622 | A1 | 10/2005 | Jacobi | |
| 2005/0256638 | A1 * | 11/2005 | Takahashi et al. | 701/209 |
| 2005/0264404 | A1 | 12/2005 | Franczyk et al. | |
| 2005/0283503 | A1 | 12/2005 | Hancock et al. | |
| 2005/0288046 | A1 | 12/2005 | Zhao et al. | |
| 2006/0006990 | A1 | 1/2006 | Obradovich | |
| 2006/0055565 | A1 | 3/2006 | Kawamata et al. | |
| 2006/0095301 | A1 | 5/2006 | Gay | |
| 2006/0129313 | A1 * | 6/2006 | Becker et al. | 701/202 |
| 2007/0216521 | A1 * | 9/2007 | Guensler et al. | 340/439 |
| 2007/0257815 | A1 * | 11/2007 | Gunderson et al. | 340/903 |
| 2008/0004802 | A1 * | 1/2008 | Horvitz | 701/209 |
| 2008/0033637 | A1 * | 2/2008 | Kuhlman et al. | 701/202 |
| 2008/0114542 | A1 * | 5/2008 | Nambata et al. | 701/209 |
| 2009/0115638 | A1 * | 5/2009 | Shankwitz et al. | 340/988 |

OTHER PUBLICATIONS

Geographic Information Systems Using CODES Linked Data (Crash Outcome Data Evaluation System), U.S. Department of Transportation National Highway Traffic Safety Administration, Apr. 2001; http://ntl.bts.gov/ lib/11000/11100/11149/809-201.pdf; 44 pages; downloaded Apr. 8, 2008.

Final Report: What Value May Geographic Information Systems Add to the Art of Identifying Crash Countermeasures? John S. Miller, Senior Research Scientist, Virginia Transportation Research Council, Charlottesville, Virginia, Apr. 1999; http://www.virginiadot.org/vtrc/main/online_reports/pdf/99-r13.pdf; 44 pages; downloaded Apr. 8, 2008.

Mapping the Streets of the World, Hilmar Schmundt, Speigel Online, May 12, 2006 03:37 PM, High Technology; http://www.spiegel.de/international/spiege1/0,1518,druck-415848,00.html; 2 pages; downloaded Jun. 25, 2008.

Patents: At the forefront of technological innovation, Printed from the Teleatlas.com website, 2007; http://www.teleatlas.com/WhyTeleAtlas/Innovation/Patents/index.htm; 1 page; downloaded Jun. 25, 2008.

Digital Collection—Metadata View; Quad City Intersection Traffic Accident Study: 1993 Data; http://ntlsearch.bts.gov/tris/record/ntl/338.html; 2 pages; downloaded Jun. 25, 2008.

Advanced Tracking Technologies, Inc., Shadow Tracker Prov5 Track Detail Map, http://www.advantrack.com/map_pro_3.htm; 1 page; downloaded Jun. 25, 2008.

Advanced Tracking Technologies, Inc.; Track Playback; http://www.advantrack.com/Animated-Track-Playback.htm; 1 page; downloaded Jun. 25, 2008.

What is Geocoding?, http://www.trpc.org/programs/gis/geocode.htm; 5 pages; downloaded Jun. 25, 2008.

Logistics, Not Consumers, Best Early Market for Premium Traffic Information, Sep. 25, 2006; http://auto.ihs.com/news/2006/abi-premium-traffic.htm; 2 pages; downloaded Jun. 25, 2008.

Property/Casualty Insurance Gaining Position With Technology; Telematics, the use of Wireless communications and Global Positioning System (GPS) tracking, may soon change the way automobile insurance, both personal and commercial, is priced. Individual rating of a driver, to supplement class rating, now appears to be feasible.; http://www. towersperrin.com/TILLINGHAST/publications/publications/emphasis/Emphasis_2005_3/Holderedge.pdf; 4 pages; downloaded Apr. 8, 2008.

IVOX's Driver Score; Personal Lines; Benefits to using IVOX DriverScore; http://www.ivosdata.com/personal_lines. html; 1 page; downloaded Jul. 25, 2008.

Group1 Software; Point-Level Geocoding Option Geocoding Enrichment Solution; http://www.g1.com/PDF/Product/PointLevelGeocode.pdf; 2 pages; downloaded Apr. 8, 2008.

Integrated Enterprise Geo-Spatial Technology—Insurance Risk Examples by Brady Foust, Ph.D., Howard Botts, Ph.D. and Margaret Miller, Ph.D., Jan. 27, 20076; http://www.directionsmag.com/printer.php?artcicle_id-2081; 2 pages; downloaded Jun. 25, 2008.

How the Discounts Work; www.SaveAsYouDrive.com; http://www.saveasyouddrive.com/page.asp?pageid=34&print=true; 2 pages; downloaded Jun. 25, 2008.

* cited by examiner

ROUTE RISK MITIGATION

RELATED APPLICATION

This application is a divisional of U.S. patent application Ser. No. 12/118,021, filed May 9, 2008, issued Dec. 10, 2013 as U.S. Pat. No. 8,606,512, which claims priority to U.S. Provisional Patent Application No. 60/917,169 filed May 10, 2007. Both of the aforementioned are incorporated by reference in their entirety herein.

TECHNICAL FIELD

Aspects of the invention relate generally to risk mitigation. More particularly, aspects of the invention relate to using geographically encoded information to promote and/or reward risk mitigation.

DESCRIPTION OF THE RELATED ART

Although insurers may vary insurance premiums based on garaging location (by state, county, etc.), there is a need in the art for enhanced systems and methods to better account for variations in a location-based risk to vehicles and subsequently acting accordingly. For example, some insurers use location-based technology such as GPS (global positioning satellites) to monitor the location of vehicles. Nevertheless, there is a need in the art for a technique for estimating the risk associated with a route using the various aspects disclosed by the present invention. Therefore, there is a benefit in the art for an enhanced method and device for calculating a risk for a road segment and using it to, among other things, mitigate risk.

SUMMARY

Aspects of the invention overcome problems and limitations of the prior art by providing a method for mitigating the risks associated with driving by assigning risk values to road segments and using those risk values to select less risky travel routes.

Various approaches to helping users mitigate risk are presented. In accordance with aspects of the invention, a computing system is disclosed for generating a data store (e.g., database) of risk values. The system may receive various types of information, including but not limited to, accident information, geographic information, and vehicle information, from one or more data sources. The system calculates a risk value for an associated road segment. Subsequently, the computing system may provide the associated risk value when provided with location information (and/or other information) for the road segment.

In an alternate embodiment in accordance with aspects of the invention, a personal navigation device, mobile device, and/or personal computing device may communicate, directly or indirectly, with the system's database of risk values. The system may receive travel route information and use that information to retrieve risk values for the associated road segments in the travel route. The system may send a compilation of the risk values to the device for display on a screen of the device or for recording in memory. The system may also aggregate risk values and form a score that is then sent for display on the screen of the device or sent for recording in a memory. The contents of memory may also be uploaded to a data store for use by, e.g., insurance companies, to determine whether to adjust a quote or premium of an insurance policy.

In an alternate embodiment in accordance with aspects of the invention, a personal navigation device, mobile device, and/or personal computing device may communicate, directly or indirectly, with the system's database of risk values. The system may receive regional location information and retrieve the risk values for road segments within the associated region and send the associated information to the device for recording into memory. The device may receive travel route information and query the memory for the associated risk values. The risk values may be sent for display on the device or for recording in memory. The contents of memory may also be uploaded to a system data store for use by, e.g., insurance companies, to determine whether to adjust a quote or premium of an insurance policy.

In yet another embodiment, in accordance with aspects of the invention, a personal navigation device, mobile device, and/or personal computing device may access the database of risk values to assist in identifying and presenting alternate lower-risk travel routes. The driver may select among the various travel routes presented, taking into account one or more factors such as a driver's tolerance for risk and/or desire to lower the cost of insurance. These factors may be saved in memory designating the driver's preferences. Depending on the driver's selection/preferences, the cost or other aspects of the vehicle's insurance coverage may be adjusted accordingly for either the current insurance policy period or a future insurance policy period.

The details of these and other embodiments of the invention are set forth in the accompanying drawings and description below. Other features and advantages of aspects of the invention will be apparent from the description and drawings.

BRIEF DESCRIPTION OF THE DRAWINGS

Aspects of the invention may take physical form in certain parts and steps, embodiments of which will be described in detail in the following description and illustrated in the accompanying drawings that form a part hereof, wherein.

It will be apparent to one skilled in the art after review of the entirety disclosed that the steps illustrated in the figures listed above may be performed in other than the recited order, and that one or more steps illustrated in these figures may be optional.

DETAILED DESCRIPTION

In accordance with aspects of the invention, a new set of pricing tiers are disclosed herein for enabling safe driving and lower rates for insurance policy customers. In addition, various approaches to helping users mitigate risk are presented. In accordance with aspects of the invention, a computing device is disclosed for generating risk values in a data store. The system may receive various types of information, including but not limited to, accident information, geographic information, and vehicle information, from one or more data sources and calculate a risk value for associated road segments. Subsequently, the computing device may provide the associated risk value when provided with location information for a road segment such as regional location information and/or other information.

In an alternate embodiment in accordance with aspects of the invention, a personal navigation device, mobile device, and/or personal computing device may communicate with the database of risk values. The devices may receive information about a travel route and use that information to retrieve risk values for road segments in the travel route. The aggregate of the risk values is sent for display on a screen of the device or for recording in memory of the device. The contents of memory may also be uploaded to a data store for use by, e.g., insurance companies, to determine whether to adjust a quote for insurance coverage or one or more aspects of current insurance coverage such as premium, specific coverages, specific exclusions, rewards, special terms, etc.

In yet another embodiment, in accordance with aspects of the invention, a personal navigation device, mobile device, and/or personal computing device may access the database of risk values to assist in identifying and presenting alternate low-risk travel routes. The driver may select among the various travel routes presented, taking into account his/her tolerance for risk. Depending on the driver's selection, the vehicle's insurance policy may be adjusted accordingly, for either the current insurance policy or a future insurance policy.

Figure 1:
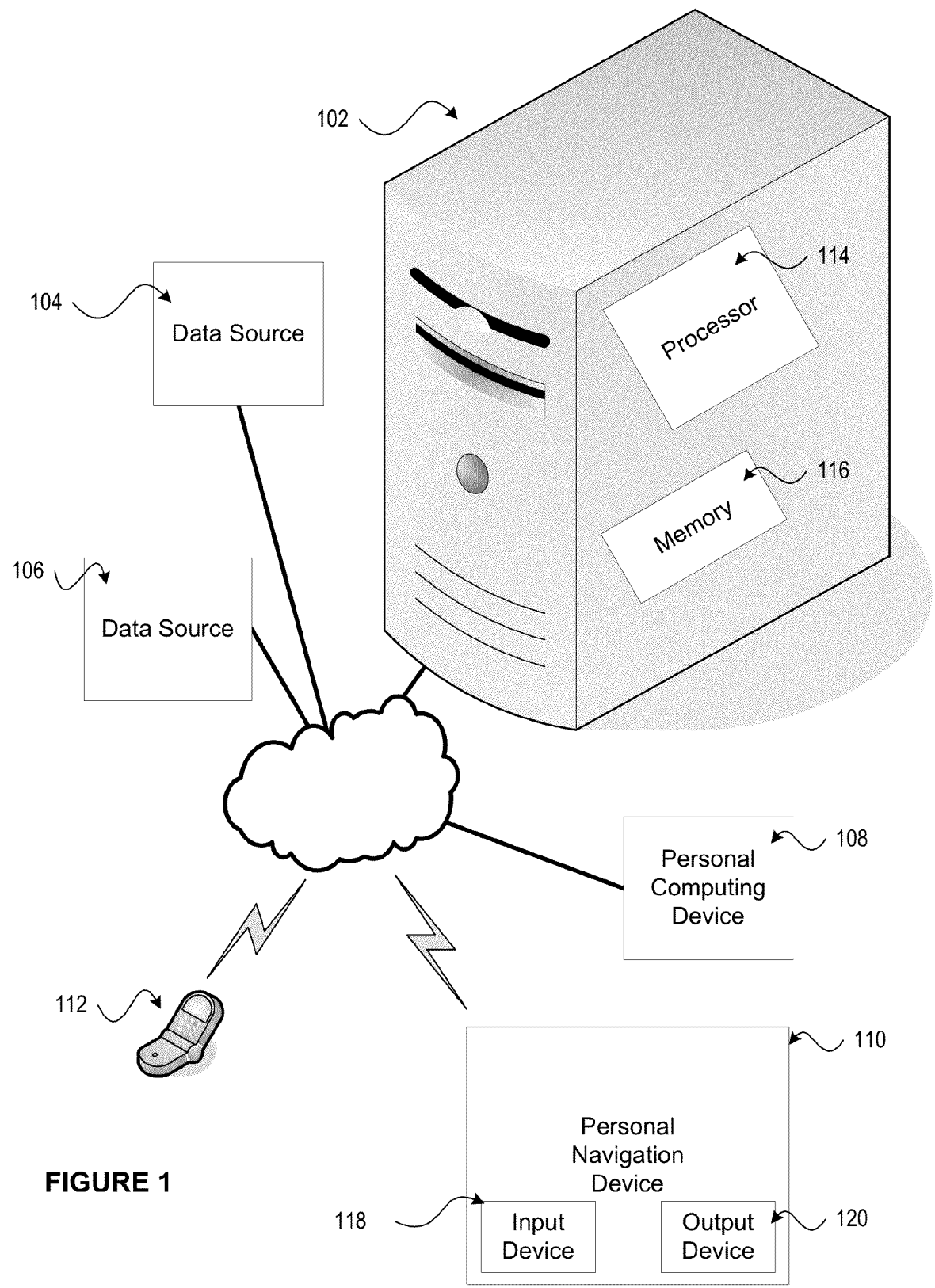
FIG. 1 depicts an illustrative operating environment in accordance with aspects of the invention.

Referring to FIG. 1, an example of a suitable operating environment in which various aspects of the invention may be implemented is shown in the architectural diagram of FIG. 1. The operating environment is only one example of a suitable operating environment and is not intended to suggest any limitation as to the scope of use or functionality of the invention. The operating environment may be comprised of one or more data sources 104, 106 in communication with a computing device 102. The computing device 102 may use information communicated from the data sources 104, 106 to generate values that may be stored in a conventional database format. In one embodiment, the computing device 102 may be a high-end server computer with one or more processors 114 and memory 116 for storing and maintaining the values generated. The memory 116 storing and maintaining the values generated need not be physically located in the computing device 102. Rather, the memory (e.g., ROM, flash memory, hard drive memory, RAID memory, etc.) may be located in a remote data store (e.g., memory storage area) physically located outside the computing device 102, but in communication with the computing device 102.

A personal computing device 108 (e.g., a personal computer, tablet PC, handheld computing device, personal digital assistant, mobile device, etc.) may communicate with the computing device 102. Similarly, a personal navigation device 110 (e.g., a global positioning system (GPS), geographic information system (GIS), satellite navigation system, mobile device, other location tracking device, etc.) may communicate with the computing device 102. The communication between the computing device 102 and the other devices 108, 110 may be through wired or wireless communication networks and/or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 102 and other devices (e.g., devices 108, 110) may be connected to one or more of the networks via twisted pair wires, coaxial cable, fiber optics, radio waves or other media. The term "network" as used herein and depicted in the drawings should be broadly interpreted to include not only systems in which devices and/or data sources are coupled together via one or more communication paths, but also stand-alone devices that may be coupled, from time to time, to such systems that have storage capability.

In another embodiment in accordance with aspects of the invention, a personal navigation device 110 may operate in a stand-alone manner by locally storing some of the database of values stored in the memory 116 of the computing device 102. For example, a personal navigation device 110 (e.g., a GPS in an automobile) may be comprised of a processor, memory, and/or input devices 118/output devices 120 (e.g., keypad, display screen, speaker, etc.). The memory may be comprised of a non-volatile memory that stores a database of values used in calculating an estimated route risk for identified routes. Therefore, the personal navigation device 110 need not communicate with a computing device 102 located at, for example, a remote location in order to calculate identified routes. Rather, the personal navigation device 110 may behave in a stand-alone manner and use its processor to calculate route risk values of identified routes. If desired, the personal navigation device 110 may be updated with an updated database of values after a period of time (e.g., an annual patch with new risk values determined over the prior year).

In yet another embodiment in accordance with aspects of the invention, a personal computing device 108 may operate in a stand-alone manner by locally storing some of the database of values stored in the memory 116 of the computing device 102. For example, a personal computing device 108 may be comprised of a processor, memory, input device (e.g., keypad, CD-ROM drive, DVD drive, etc.), and output device (e.g., display screen, printer, speaker, etc.). The memory may be comprised of CD-ROM media that stores values used in calculating an estimated route risk for an identified route. Therefore, the personal computing device 108 may use the input device to read the contents of the CD-ROM media in order to calculate a value for the identified route. Rather, the personal computing device 108 may behave in a stand-alone manner and use its processor to calculate a route risk value. If desired, the personal computing device 108 may be provided with an updated database of values (e.g., in the form of updated CD-ROM media) after a period of time. One skilled in the art will appreciate that personal computing device 108, 110, 112 need not be personal to a single user; rather, they may be shared among members of a family, company, etc.

The data sources 104, 106 may provide information to the computing device 102. In one embodiment in accordance with aspects of the invention, a data source may be a computer which contains memory storing data and is configured to provide information to the computing device 102. Some examples of providers of data sources in accordance with aspects of the invention include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the invention, access to the information in the data sources 104, 106 may be restricted to only authorized computing devices 102 and for only permissible purposes. For example, access to the data sources 104, 106 may be restricted to only those persons/ entities that have signed an agreement (e.g., an electronic agreement) acknowledging their responsibilities with regard to the use and security to be accorded this information.

The computing device 102 uses the information from the data sources 104, 106 to generate values that may be used to calculate an estimated route risk. Some examples of the information that the data sources 104, 106 may provide to the computing device 102 include, but are not limited to, accident information, geographic information, and other types of information useful in generating a database of values for calculating an estimated route risk.

Some examples of accident information include, but are not limited to, loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle is traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), and location (e.g., geographic coordinates, closest address, zip code, etc.) of vehicle at time of incident.

Accident information associated with vehicle accidents may be stored in a database format and may be compiled per segment. One skilled in the art will understand that the term segment may be interchangeably used to describe a road segment, intersection, round about, bridge, tunnel, ramp, parking lot, railroad crossing, or other feature that a vehicle may encounter along a route.

Time relevancy validation relates to the relevancy of historical accident information associated with a particular location. Time relevancy validation information may be dynamically created by comparing the time frames of accident information to the current date. For example, if a location or route had many collisions prior to five years ago but few since, perhaps a road improvement reduced the risk (such as adding a traffic light). Time relevancy information may be generated remotely and transmitted by a data source 104, 106 to the computing device 102 like other information. Alternatively, time relevancy information may be calculated at the computing device 102 using other information transmitted by a data source 104, 106. For example, the appropriateness of historical information may be related to the time frame into which the information belongs. Examples of time frames may include, but are not limited to, less than 1 year ago, 1 year ago, 2 years ago, 3 years ago, 4 years ago, 5 to 10 years ago, and greater than 10 years ago. In one embodiment, the more recent the historical information, the greater weight is attributed to the information.

Some examples of geographic information include, but are not limited to, location information and attribute information. Examples of attribute information include, but are not limited to, information about characteristics of a corresponding location described by some location information: posted speed limit, construction area indicator (i.e., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of road/lanes, population density, condition of road (e.g., new, worn, severely damaged with sink-holes, severely damaged with erosion, gravel, dirt, paved, etc.), wildlife area, state, county, and/or municipality. Geographic information may also include other attribute information about road segments, intersections, bridges, tunnels, railroad crossings, and other roadway features.

Location information for an intersection may include the latitude and longitude (e.g., geographic coordinates) of the geometric center of the intersection. The location may be described in other embodiments using a closest address to the actual desired location or intersection. The intersection (i.e., location information) may also include information that describes the geographic boundaries, for example, of the intersection which includes all information that is associated within a circular area defined by the coordinates of the center of the intersection and points within a specified radius of the center. In another example of location information, a road segment may be defined by the latitude and longitude of its endpoints and/or an area defined by the road shape and a predetermined offset that forms a polygon. Segments may comprise intersections, bridges, tunnels, rail road crossings or other roadway types and features. Those skilled in the art will recognize that segments can be defined in many ways without departing from the spirit of this disclosed invention.

Some examples of vehicle information include, but are not limited to, information that describes vehicles that are associated with incidents (e.g., vehicle accidents, etc.) at a particular location (e.g., a location corresponding to location information describing a segment, intersection, etc.) Vehicle information may include vehicle make, vehicle model, vehicle year, and age. Vehicle information may also include information collected through one or more in-vehicle devices or systems such as an event data recorder (EDR), onboard diagnostic system, or global positioning satellite (GPS) device; examples of this information include speed at impact, brakes applied, throttle position, direction at impact. As is clear from the preceding examples, vehicle information may also include information about the driver of a vehicle being driven at the time of an incident. Other examples of driver information may include age, gender, marital status, occupation, alcohol level in blood, credit score, distance from home, cell phone usage (i.e., whether the driver was using a cell phone at the time of the incident), number of occupants.

In one embodiment in accordance with aspects of the invention, a data source 104 may provide the computing device 102 with accident information that is used to generate values (e.g., create new values and/or update existing values). The computing device 102 may use at least part of the received accident information to calculate a value, associate the value with a road segment (or other location information), and store the value in a database format. One skilled in the art will appreciate, after thorough review of the entirety disclosed herein, that there may be other types of information that may be useful in generating a database of values for use in, among other things, calculating an estimated route risk.

For example, in accordance with aspects of the invention, a data source 104 may provide the computing device 102 with geographic information that is used to generate new roadway feature risk values in a database of risk values and/or update existing risk values; where the roadway feature may comprise intersections, road segments, tunnels, bridges, or railroad crossings. Attributes associated with roadways may also be used in part to generate risk values. The computing device 102 may use at least part of the received geographic information to calculate a value, associate the value with a road segment (or other location information), and store the value in a database format. Numerous examples of geographic information were provided above. For example, a computing device 102 may receive geographic information corresponding to a road segment comprising accident information and roadway feature information and then calculate a risk value. Therefore, when calculating a risk value, the system may use, in one example, the geographic information and the accident information (if any accident information is provided). In alternative embodiments in accordance with aspects of the invention, the computing device may use accident information, geographic information, vehicle information, and/or other information, either alone or in combination, in calculating risk values in a database format.

The values generated by the computing device 102 may be associated with a road segment containing the accident location and stored in a data store. Similar to a point of interest (POI) stored in GPS systems, a point of risk (POR) is a road segment or point on a map that has risk information associated with it. Points of risk may arise because incidents (e.g., accidents) have occurred at these points before. In accordance with aspects of the invention, the road segment may be a predetermined length (e.g., ¼ mile) on a stretch of road. Alternatively, road segments may be points (i.e., where the predetermined length is minimal) on a road. Furthermore, in some embodiments, road segment may include one or more different roads that are no farther than a predetermined radius from a road segment identifier. Such an embodiment may be beneficial in a location, for example, where an unusually large number of streets intersect, and it may be impractical to designate a single road for a road segment.

Figure 2:
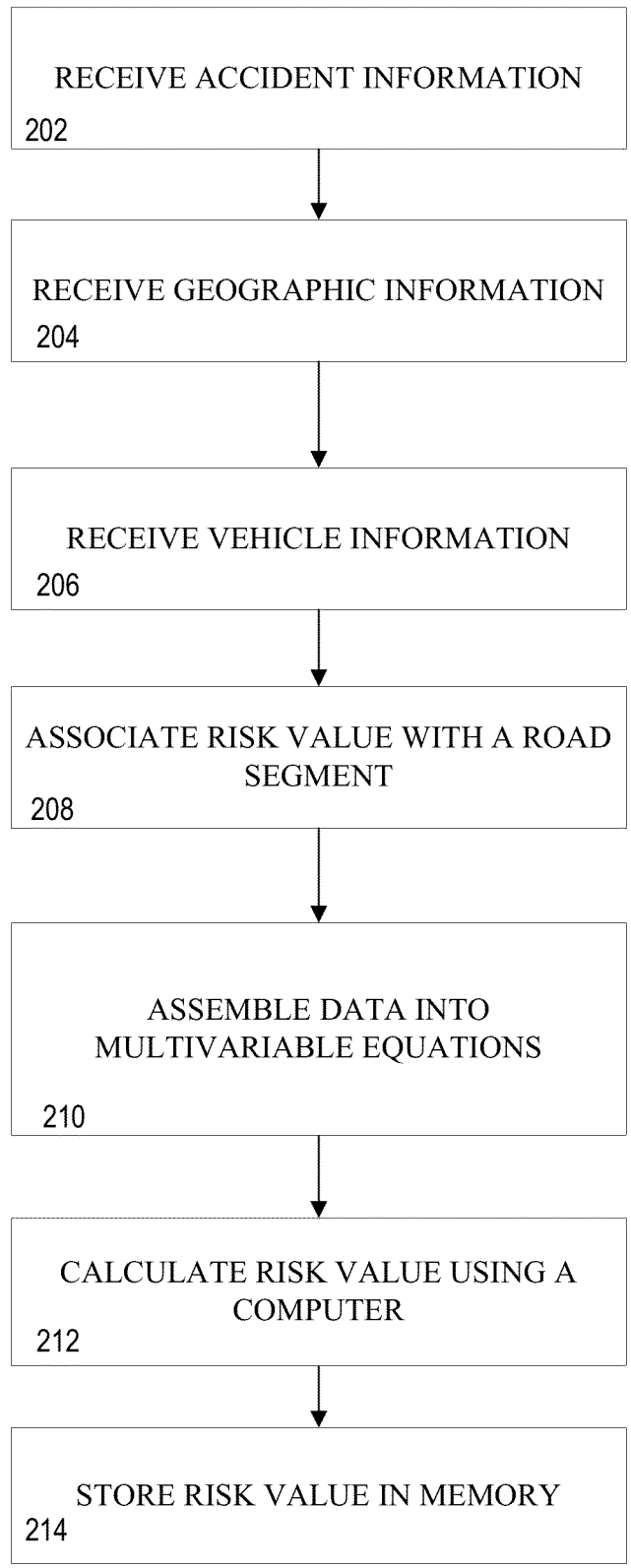
FIG. 2 depicts illustrative steps for calculating the risk value of a route segment by applying actuarial and/or statistical methods in accordance with aspects of the invention.

Referring to FIG. 2, in accordance with aspects of the invention, a computing device 102 may receive accident information (in step 202), geographic information (in step 204), and/or vehicle information (in step 206). The computing device 102 may calculate (in step 212) the risk value for a road segment (or point of risk) by applying actuarial techniques to the information that may be received from data sources 104, 106. In one embodiment, the computing device 102 receives and stores the accident information in a data store with the latitude/longitude and time of the incident. The accident data is associated with a location and combined with other accident data associated with the same location (in step 210). Applying actuarial and/or statistical modeling techniques involving multiple predictors, such as generalized linear models and non-linear models, a risk value may be calculated (212), and the calculated risk value may be recorded in memory (116) (in step 214). The multiple predictors involved in the statistical model used to calculate a risk value may include accident information, geographic information, and vehicle information. Associating the risk value (in step 208) with a line segment and/or point which best pinpoints the area of the road in which the incident(s) occurred may be accomplished by using established GIS locating technology (e.g., GPS ascertaining a geographically determinable address, and assigning the data file to a segment's or intersection's formal address determined by the system). For example, two or more accidents located in an intersection or road segment may have slightly different addresses depending on where within the intersection or segment the accident location was determined to be. Therefore, the system may identify a location based on business rules. In another example business rules may identify an incident location using the address of the nearest intersection. In yet another example the system may identify the location of an incident on a highway using segments based on mileage markers or the lengths may be dynamically determined by creating segment lengths based on relatively equal normalized risk values. Therefore, roadways that have stretches with higher numbers of accidents may have shorter segments than stretches that have fewer accidents. In another example, if the incident occurred in a parking lot, the entire parking lot may be associated with a formal address that includes all accidents located within a determined area. One skilled in the art will appreciate after review of the entirety disclosed that road segment includes a segment of road, a point on a road, and other designations of a location (e.g., an entire parking lot).

For example, an insurance claim-handling processor may collect data about numerous incidents such as collision, theft, weather damage, and other events that cause any one of (or combination of) personal injury, vehicle damage, and damage to other vehicles or property. Information about the accident may be collected through artifacts such as first notice of loss (FNOL) reports and claim adjuster reports and may be stored in one or more data stores used by the insurer. Other data may also be collected at the point and time when the incident occurred, and this information (e.g., weather conditions, traffic conditions, vehicle speed, etc.) may be stored with the other accident information. The information in these data stores may be distributed by data sources 104, 106 in accordance with aspects of the invention. In addition, some information may also be recorded in third-party data sources that may be accessible to one or more insurance companies. For example, traffic information (e.g., traffic volume) and weather information may be retrieved in real-time (or near real-time) from their respective data sources.

Figure 3:
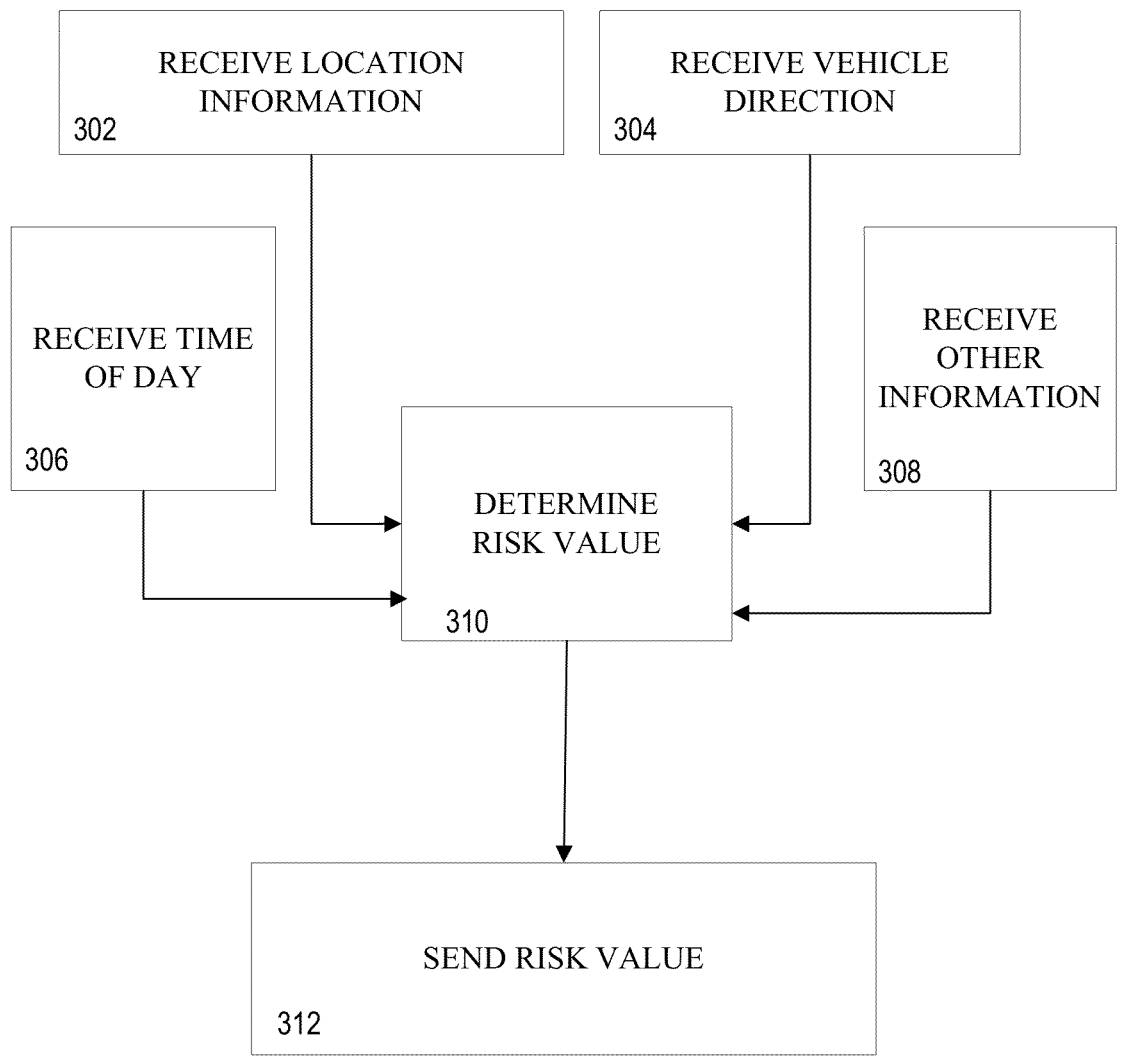
FIG. 3 depicts illustrative steps for determining and providing risk values to a computing device in accordance with aspects of the invention.

Referring to FIG. 3, in accordance with aspects of the invention, the computing device 102 may send (in step 312) the risk value corresponding to a road segment when it receives location information (in step 302) requesting the risk associated with a particular location. The particular location information may be in the form of longitude/latitude coordinates, street address, intersection, closest address, or other form of information. Furthermore, in an alternative embodiment the accuracy of the risk value may be improved by submitting the direction that a vehicle travels (or may travel) through a road segment. The computing device 102 may receive (in step 304) the vehicle direction and use it to determine the risk value associated with the vehicle route. For example, a dangerous intersection demonstrates high risk to a vehicle/driver that passes through it. However, actuarial analysis (e.g., of data showing many recorded accidents at the location) may show that it is more dangerous if the driver is traveling northbound on the road segment and turns left. Therefore, the vehicle direction may also be considered when retrieving the appropriate risk value (in step 310).

Likewise, the computing device 102 may also receive (in step 308) other information to enhance the accuracy of the risk value associated with a travel route. For example, the computing device 102 may receive (in step 306) the time of day when the driver is driving (or plans to drive) through a particular travel route. This information may improve the accuracy of the risk value retrieved (in step 310) for the travel route. For example, a particular segment of road through a wilderness area may have a higher rate of accidents involving deer during the night hours, but no accidents during the daylight hours. Therefore, the time of day may also be considered when retrieving the appropriate risk value (in step 310). In addition, the computing device may receive (in step 308) other information to improve the accuracy of the risk value retrieved (in step 310) for a travel route. Some examples of this other information include, but are not limited to, the vehicle's speed (e.g., a vehicle without a sport suspension attempting to take a dangerous curve at a high speed), vehicle's speed compared to the posted speed limit, etc.

In accordance with aspects of the invention, a computer-readable medium storing computer-executable instructions for performing the steps depicted in FIGS. 2 and 3 and/or described in the present disclosure is contemplated. The computer-executable instructions may be configured for execution by a processor (e.g., processor 114 in computing device 102) and stored in a memory (e.g., memory 116 in computing device 102). Furthermore, as explained earlier, the computer-readable medium may be embodied in a non-volatile memory (e.g., in a memory in personal navigation device 110) or portable media (e.g., CD-ROM, DVD-ROM, USB flash, etc. connected to personal computing device 108).

In accordance with aspects of the invention, a personal navigation device 110 may calculate a route risk value for a travel route of a vehicle. The personal navigation device 110 may be located, for example, in a driver's vehicle or in a mobile device 112 with location tracking capabilities. Alternatively, a personal computing device 108 may be used to calculate the route risk value for a travel route of a vehicle.

Figure 4:
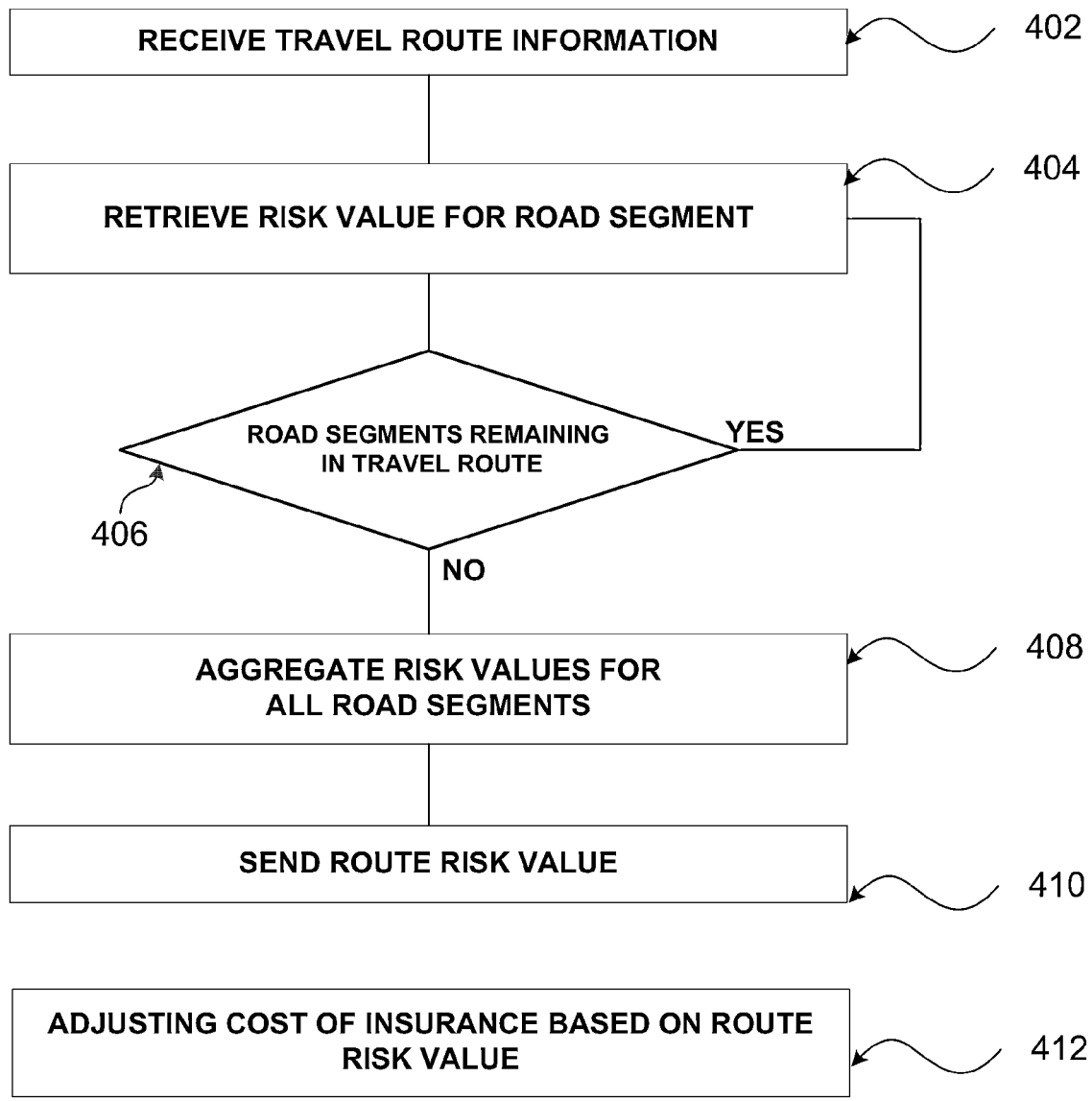
FIG. 4 depicts illustrative steps for calculating the risk value of a travel route in accordance with aspects of the invention.

For example, referring to FIG. 4, a personal navigation device 110 may receive (in step 402) travel route information. The travel route information may include, but is not limited to, a start location, end location, road-by-road directions, and/or turn-by-turn directions. The personal navigation device 110 may use the travel route information and mapping software to determine the road segment upon which the vehicle will travel, and retrieve (in step 404) the risk value for that road segment. For each subsequent road segment remaining in the travel route (see step 406), the personal navigation device 110 may access the database of risk values to retrieve (in step 404) the risk value for that road segment. As explained earlier, the database of risk values may be stored locally to the personal navigation device 110, or may be stored remotely and accessed through a wired/wireless link to the data store.

The risk values retrieved (in step 404) for the travel route may be aggregated (in step 408) and a total risk value for the travel route may be sent (in step 410). In an alternate embodiment, the computing device 102 may count the number of each type of road risk along the travel route based on the values stored in the database. This number may then be multiplied by a risk-rating factor for the respective risk type. A risk type may comprise intersections, locations of past accidents along a route, railroad crossings, merges, roadway class (residential, local, commercial, rural, highways, limited access highways). Other risk types may include proximity to businesses that sell alcohol, churches or bingo parlors.

The sum of this product over all risk types may, in this alternate embodiment, equal the total route risk value. The total route risk value may be divided by the distance traveled to determine the route risk category for the travel route. For example, a route risk category may be assigned based on a set of route risk value ranges for low, medium, and high risk routes.

After being aggregated, the total risk value may be sent (in step 410) to a viewable display on the personal navigation device 110. Alternatively, the total risk value may be sent (in step 410) to a local/remote memory where it may be recorded and/or monitored. For example, it may be desirable for a safe driver to have her total risk value for all travel routes traveled over a time period to be uploaded to an insurance company's data store. The insurance company may then identify the driver as a lower-risk driver (e.g., a driver that travels on statistically lower-risk routes during lower-risk times) and provide the driver/vehicle with a discount and/or credit (in step 412) on an existing insurance policy (or towards a future insurance policy). At least one benefit of the aforementioned is that safe drivers are rewarded appropriately, while high-risk drivers are treated accordingly.

In some embodiments in accordance with aspects of the invention, the route risk value sent (in step 410) may be in the form of a number rating the risk of the travel route (e.g., a rating of 1 to 100 where 1 is very low risk and 100 is very high risk). Alternatively, the route risk value may be in the form of a predetermined category (e.g., low risk, medium risk, and high risk). At least one benefit of displaying the route risk value in this form is the simplicity of the resulting display for the driver. For example, an enhanced GPS unit may display a route (or segment of a route) in a red color to designate a high risk route, and a route may be displayed in a green color to designate a lower risk route. At least one benefit of a predetermined category for the route risk value is that it may be used as the means for comparing the amount of risk associated with each travel route when providing alternate routes. In addition, the enhanced GPS unit may alert the driver of a high risk road segment and offer the driver an incentive (e.g., monetary incentive, points, etc.) for avoiding that segment.

In accordance with aspects of the invention, a computer-readable medium storing computer-executable instructions for performing the steps depicted in FIG. 4 and/or described in the present disclosure is contemplated. The computer-executable instructions may be configured for execution by a processor (e.g., a processor in personal navigation device 110) and stored in a memory (e.g., flash memory in device 110).

When retrieving risk values, in accordance with aspects of the invention, one or more techniques, either alone or in combination, may be used for identifying and calculating the appropriate risk value for road segments. For example, under an accident cost severity rating (ACSR) approach, each point of risk has a value which measures how severe the average accident is for each point of risk. The value may be normalized and/or scaled by adjusting the range of the values. For example, under an ACSR approach using a range of values from 1 to 10: considering all accidents that occur in a predetermined area (e.g., road segment, state, zip code, municipality, etc.), the accidents in the top ten percentile of expensive accidents in that territory would get a 10 value and the lowest 10 percentile of costly accidents in that region would get a 1 value. The actual loss cost may be calculated by summing the various itemized loss costs (e.g., bodily injury, property damage, medical/personal injury protection, collision, comprehensive, uninsured/underinsured motorist, rental reimbursement, towing, etc.).

In an alternate embodiment, the ACSR approach may attribute varying weights to the different types of loss costs summed to calculate the actual loss cost. For example, after analyzing the information, certain portions of a loss cost (e.g., medical cost) may indicate risk more accurately than others. The importance of these portions may be weighted more heavily in the final loss cost calculation. Actuarial methods may be used to adjust loss cost data for a segment where a fluke accident may cause the calculated risk value to far exceed the risk value based on all the other data.

Under the accidents per year (APYR) approach, in accordance with aspects of the invention, each point of risk has a risk value that may reflect the average number of accidents a year for that individual point of risk. Under a modified APYR approach, the risk value for a point of risk continues to reflect the average number of accidents a year, but attributes a lesser weight to accidents that occurred a longer time ago, similar to time relevancy validation (e.g., it gives emphasis to recent accident occurrences over older occurrences).

Under the risk severity (RSR) approach, in accordance with aspects of the invention, each point of risk has a risk value that may reflect the severity of risk for that individual point of risk. For example, an intersection that is a frequent site of vehicle accident related deaths may warrant a very high risk value under the RSR approach. In one embodiment, risk severity rating may be based on accident frequency at intersections or in segments over a determined period of time. In another embodiment, the rating may be based on loss costs associated to intersections and segments. Yet another embodiment may combine accident frequency and severity to form a rating for a segment or intersection. One skilled in the art can recognize that risk severity ratings may be based on one or a combination of factors associated with intersections or segments.

Under the Environmental Risk Variable (ERV) approach, in accordance with aspects of the invention, each point of risk has a risk value that may reflect any or all information that is not derived from recorded accidents and/or claims, but that may be the (direct or indirect) cause of an accident. In one embodiment, the risk value under the ERV approach may be derived from vehicle information transmitted by a data source 104, 106. In an alternate embodiment, the EVR approach may use compound variables based on the presence or absence of multiple risk considerations which are known to frequently, or severely, cause accidents. A compound variable is one that accounts for the interactions of multiple risk considerations, whether environmental or derived from recorded accidents and/or claims. For example, driving through a wildlife crossing zone at dusk would generate a greater risk value than driving through this same area at noon. The interaction of time of day and location would be the compound variable. Another example may consider current weather conditions, time of day, day of the year, and topography of the road. A compound variable may be the type of infrequent situation which warrants presenting a verbal warning to a driver (e.g., using a speaker system in a personal navigation device 110 mounted in a vehicle) of a high risk route (e.g., a high risk road segments).

Another possible approach may be to calculate the route risk value using one or more of the approaches described above divided by the length of the route traveled. This may provide an average route risk value for use in conjunction with a mileage rating plan. In one embodiment, the system combines route risk and conventional mileage data to calculate risk per mile rating.

In one embodiment, a device in a vehicle (e.g., personal navigation device 110, mobile device 112, etc.) may record and locally store the route and/or the route and time during which a route was traveled. This travel route information may be uploaded via wireless/wired means (e.g., cell phones, manually using a computer port, etc.). This travel route information may be used to automatically query a data source 104, 106 for route rating information and calculate a total risk value.

Some accident data may be recorded and locally stored on a device (e.g., personal navigation device 110, mobile device 112, etc.) that provides incident location and a timestamp that can be used to synchronize other data located in data sources 104 and 106. The captured information may be periodically uploaded to computing device 102 for further processing of accident data for updating the road segment database in memory 116. In some embodiments, the other data may include local weather conditions, vehicle density on the roadway, and traffic signal status. Additional information comprising data from an in-vehicle monitoring system (e.g., event data recorder or onboard diagnostic system) may record operational status of the vehicle at the time of the incident. Alternatively, if the vehicle did not have a location tracking device, an insurance claims reporter may enter the address and other information into the data source manually. If the vehicle was configured with an in-vehicle monitoring system that has IEEE 802.11 Wi-Fi capabilities (or any other wireless communication capabilities), the travel route information may be periodically uploaded or uploaded in real-time (or near real-time) via a computer and/or router. The in-vehicle monitoring system may be configured to automatically upload travel route information (and other information) through a home wireless router to a computer. In some advanced monitoring systems, weather and traffic data (and other useful information) may be downloaded (in real-time or near real-time) to the vehicle. In some embodiments, it may be desirable to use mobile devices 112 (with the requisite capabilities) to transmit the information, provide GPS coordinates, and stream in data from other sources.

The risk types described above may be variables in a multivariate model of insurance losses, frequencies, severities, and/or pure premiums. Interactions of the variables would also be considered. The coefficient the model produces for each variable (along with the coefficient for any interaction terms) would be the value to apply to each risk type. The personal navigation device 110 may initially provide the quickest/shortest route from a start location A to an end location B, and then determine the route risk value by determining either the sum product of the number of each risk type and the value for that risk type or the overall product of the number of each risk type and the value for that risk type. (Traffic and weather conditions could either be included or excluded from the determination of the route risk value for comparison of routes. If not included, an adjustment may be made to the route risk value once the route has been traveled). The driver may be presented with an alternate route which is less risky than the initial route calculated. The personal navigation device 110 may display the difference in risk between the alternate routes and permit the driver to select the preferred route. In some embodiments in accordance with the invention, a driver/vehicle may be provided a monetary benefit (e.g., a credit towards a future insurance policy) for selecting a less risky route.

In one example in accordance with aspects of the invention, a driver may enter a starting location and an end location into a personal navigation device 110. The personal navigation device 110 may present the driver with an illustrative 2-mile route that travels on a residential road near the following risks: 5 intersections, 3 past accident sites, 1 railroad crossing, and 1 lane merging site. Assuming for illustrative purposes that the following risk values apply to the following risk types:

| Risk Type | Risk-rating Factor |
|---|---|
| Intersections | 55 |
| Past Accidents | 30 |
| Railroad Crossing | 5 |
| Merge | 60 |
| Residential Road | 2 per mile |

Then, the route risk value for the entire 2-mile route may be calculated, in one embodiment of the invention, as follows:

| Risk Type | Risk-rating Factor | Count | Product |
|---|---|---|---|
| Intersections | 55 | 5 | 55 * 5 = 275 |
| Past Accidents | 30 | 3 | 30 * 3 = 90 |
| Railroad Crossing | 5 | 1 | 5 * 1 = 5 |
| Merge | 60 | 1 | 60 * 1 = 60 |
| Residential Road | 2 per mile | 2 | 2 * 2 = 4 |
| Sum Total | | | 434 |

Assuming a route risk value between 0 and 350 (per mile) is categorized as a low-risk route, then the aforementioned 2-mile route's risk value of 217 (i.e., 434 divided by 2) classifies it a low-risk route.

In some embodiments, for rating purposes the route risk value may consider the driving information of the driver/vehicle. For example, the personal navigation device 110 (or other device) may record the route taken, as well as the time of day/month/year, weather conditions, traffic conditions, and the actual speed driven compared to the posted speed limit. The current weather and traffic conditions may be recorded from a data source 104, 106. Weather conditions and traffic conditions may be categorized to determine the risk type to apply. The posted speed limits may be included in the geographic information. For each segment of road with a different posted speed limit, the actual speed driven may be compared to the posted speed limit. The difference may be averaged over the entire distance of the route. In addition, various techniques may be used to handle the amount of time stopped in traffic, at traffic lights, etc. One illustrative technique may be to only count the amount of time spent driving over the speed limit and determine the average speed over the speed limit during that time. Another illustrative method may be to exclude from the total amount of time the portion where the vehicle is not moving. Then, upon completion of the trip, the route risk value may be calculated and stored in memory along with the other information related to the route risk score and mileage traveled. This information may later be transmitted to an insurance company's data store, as was described above.

In another embodiment in accordance with aspects of the invention, real time data may be used to dynamically assign risk values to each point of risk. For example, some road segments may have a higher risk value when a vehicle travels through at a time when, e.g., snowfall is heavy. In such situations, a dynamic risk value may be applied to the road segment to determine the appropriate route risk value to assign to the route.

Figure 5:
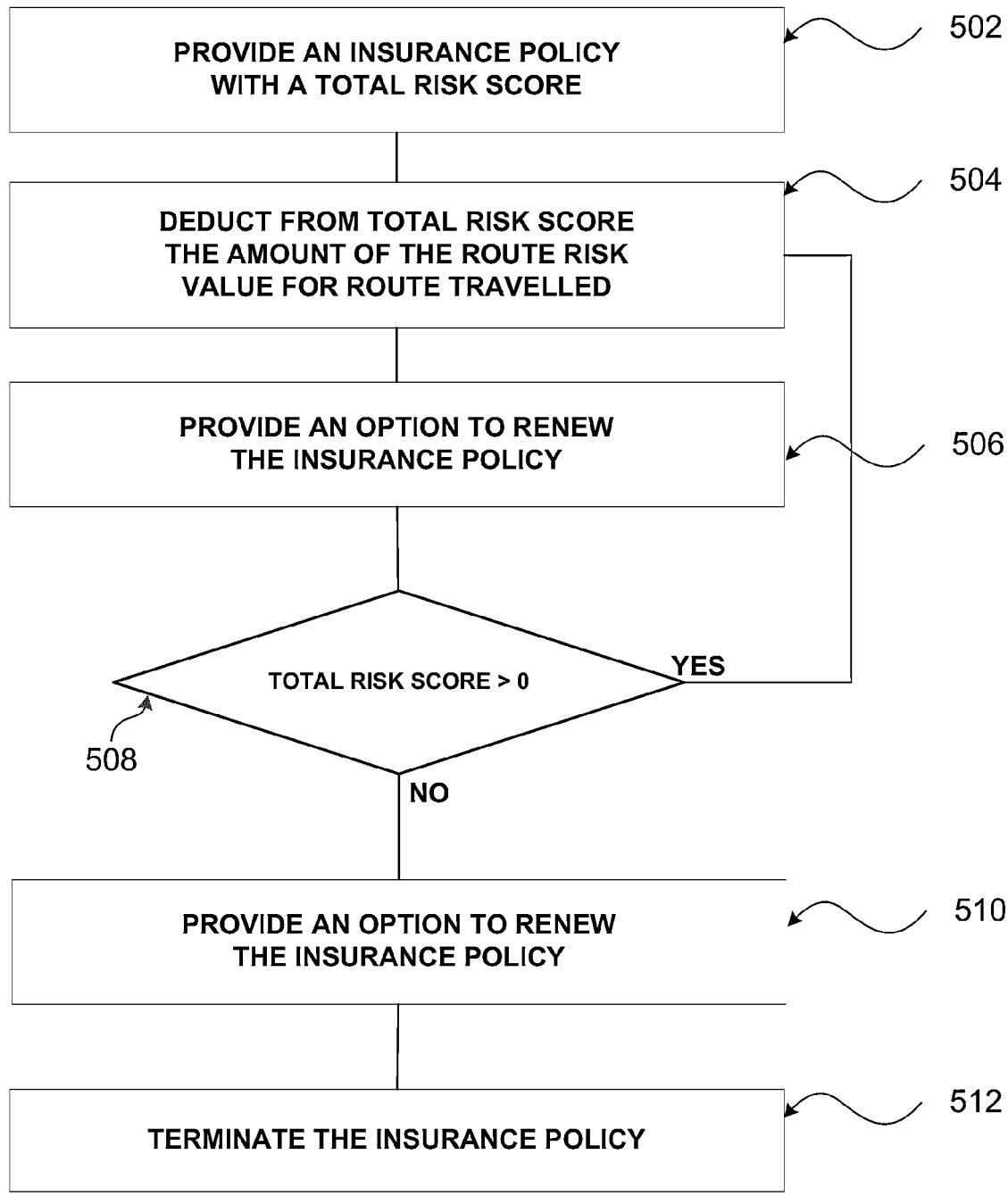
FIG. 5 depicts illustrative steps for providing an insurance policy based on risk consumption in accordance with aspects of the invention.

Referring to FIG. 5, in accordance with aspects of the invention, a method of selling a vehicular insurance policy is illustrated. A vehicle owner or driver may be provided (in step 502) with an insurance policy with a total risk score. The total risk score (e.g., 500) indicates the quantity of risk the vehicle is permitted to travel through before the insurance policy must be renewed or becomes terminated. For example, as the vehicle is driven over various travel routes, the route risk values for the road segments traveled are deducted (in step 504) from the total risk score of the insurance policy. The vehicle owner and/or driver may be provided (in step 506) an option to renew the insurance policy (e.g., to purchase additional risk points to apply towards the total risk score of the insurance policy). Once the total risk score falls to zero or under (see step 508), the vehicle owner and/or driver (or any other person/entity authorized to renew the policy) is provided (in step 510) with a final option to renew the insurance policy before the insurance policy terminates (in step 512). It will be apparent to one skilled in the art after review of the entirety disclosed that the embodiment illustrated above may benefit from a personal navigation device 110 (or similar device) to monitor and record the route traveled by a vehicle. At least one benefit of the insurance policy illustrated by FIG. 5 is the ability to pay per quantity of risk consumed instead of paying only a fixed premium.

In another embodiment in accordance with aspects of the invention, route-dependent pricing uses route risk values to adjust insurance pricing based on where a vehicle is driven. Contrary to the embodiment above where the vehicle's insurance policy terminated dependent on the quantity of risk consumed by the vehicle's travel route, in this embodiment, an insurance company (or its representatives, e.g., agent) may adjust the price quoted/charged for an insurance policy based on risk consumed. In this embodiment, a vehicle/driver may be categorized into a risk class (e.g., low-risk, medium-risk, high risk, etc.) and charged for insurance accordingly. For example, the vehicle/driver may be provided with notification of a credit/debit if the vehicle consumed less/more, respectively, of risk at the end of a policy term than was initially purchased.

In another embodiment: the insurance policy is sold and priced in part based on where a customer falls within a three sigma distribution of risk units consumed by all insured per a typical policy period. The policy pricing may be based on an initial assumption of risk to be consumed in the prospective policy period or may be based on risk consumed in a preceding policy period. In a case where the number of risk units consumed is greater than estimated, the customer may be billed for the overage at the end of (or during) the policy period. In yet another embodiment, the system may be provided as a pay-as-you-drive coverage where the customer is charged in part based on the actual risk units consumed in the billing cycle. The system may include a telematics device that monitors, records, and periodically transmits the consumption of risk units to processor 114 that may automatically bill or deduct the cost from an account.

While the invention has been described with respect to specific examples including presently exemplary modes of carrying out the invention, those skilled in the art will appreciate that there are numerous variations and permutations of the above-described systems and techniques that fall within the spirit and scope of the invention.

We claim:
1. A method, comprising:
  receiving, from a first processor in communication with a location detection unit located in a vehicle, a travel route of the vehicle;
  retrieving, by a second processor in communication over at least a wireless network with the first processor, a segment value for each of a plurality of road segments corresponding to the travel route of the vehicle, wherein each segment value is based at least on accident information corresponding to each of the plurality of road segments, wherein the accident information comprises accident loss information and direction of travel at accident location;

aggregating segment values, by the second processor, to calculate a route value for the travel route of the vehicle; and sending, by the second processor over the at least a wireless network to the first processor located in the vehicle, the route value for the travel route of the vehicle.

2. The method of claim 1, wherein accident information comprises number of vehicle accidents.

3. The method of claim 1, wherein accident information comprises at least one of: vehicle direction at time of damage, accident time, and accident date.

4. The method of claim 1, wherein the route value is a predetermined risk category comprised of low, medium, and high.

5. The method of claim 1, wherein each segment value is further based at least on accident location information corresponding to each of the plurality of road segments.

6. The method of claim 1, in response to receiving, by the second processor, a request for a risk value associated with a particular location, sending, by the second processor over the at least a wireless network to the first processor located in the vehicle, a value associated with a road segment containing the particular location.

7. The method of claim 1, wherein the vehicle is associated with a vehicle insurance policy, the method comprising:

calculating, by the second processor, a total risk score for the travel route of the vehicle based on the aggregated segment values; and adjusting a cost of the vehicle insurance policy for the vehicle based on the route value, wherein the adjusting is further based at least in part on the total risk score.

8. The method of claim 7, wherein the vehicle is designated in a predetermined class based on a total risk score, and the adjusting of the cost is further based at least in part on the predetermined class.

9. The method of claim 7, comprising:

transmitting, by the second processor, a notification to a policyholder of the vehicle insurance policy of a credit based on the cost of the vehicle insurance policy is less after the adjusting.

10. The method of claim 7, comprising:

generating a notification, by the second processor, of an option to renew the vehicle insurance policy before terminating the vehicle insurance policy; and displaying in the vehicle, by the first processor, the generated notification of the option to renew the vehicle insurance policy.

11. The method of claim 7, comprising:

receiving, at the second processor, geographic information corresponding to the plurality of road segments; and wherein the calculating of the total risk score is further based at least in part on the geographic information.

12. The method of claim 1, comprising:

in response to receiving a request for a risk value associated with a particular road segment of the plurality of road segments, sending, by the second processor, a value associated with the road segment considering vehicle direction through the particular road segment.

13. The method of claim 1, wherein the route value is calculated using an accident cost severity rating approach.

14. A system comprising:

a location detection unit, located in a vehicle, configured to detect locations of the vehicle comprising at least a start location and an end location;

a first processor in communication with the location detection unit;

a second processor in communication over at least a wireless network with the first processor;

a computer memory storing instructions that, when executed by the second processor, causes the system to:

receive, from the first processor in communication with the location detection unit located in the vehicle, a travel route of the vehicle;

retrieving, by the second processor in communication over at least a wireless network with the first processor, a segment value for each of a plurality of road segments corresponding to the travel route of the vehicle, wherein each segment value is based at least on accident information corresponding to each of the plurality of road segments, wherein the accident information comprises accident loss information and direction of travel at accident location;

aggregating segment values, by the second processor, to calculate a route value for the travel route of the vehicle; and sending, by the second processor over the at least a wireless network to the first processor located in the vehicle, the route value for the travel route of the vehicle.

15. The system of claim 14, wherein the vehicle is associated with a vehicle insurance policy, and wherein the computer memory stores instructions that, when executed by the second processor, further causes the system to:

calculate, by the second processor, a total risk score for the travel route of the vehicle based on the aggregated segment values;

adjust a cost of the vehicle insurance policy for the vehicle based on the route value, wherein the adjusting is further based at least in part on the total risk score; and based on the safety risk score of the route, debit an account associated with the vehicle insurance policy.

16. The system of claim 14, wherein the computer memory stores instructions that, when executed by the second processor, further causes the system to:

in response to receiving, by the second processor, a request for a risk value associated with a particular location detected by the location determination unit, send, by the second processor over the at least a wireless network to the first processor located in the vehicle, a value associated with a road segment containing the particular location.

17. A non-transitory computer-readable memory storing computer-executable instructions that when executed by a processor, causes the processor to:

receive, from a location detection unit located in a vehicle, a travel route of the vehicle;

retrieve, over at least a wireless network, a segment value for each of a plurality of road segments corresponding to the travel route of the vehicle, wherein each segment value is based at least on accident information corresponding to each of the plurality of road segments, wherein the accident information comprises accident loss information and direction of travel at accident location;

aggregate segment values to calculate a route value for the travel route of the vehicle; and send, over the at least a wireless network, the route value for the travel route of the vehicle.

* * * * *